UNITED STATES PATENT OFFICE.

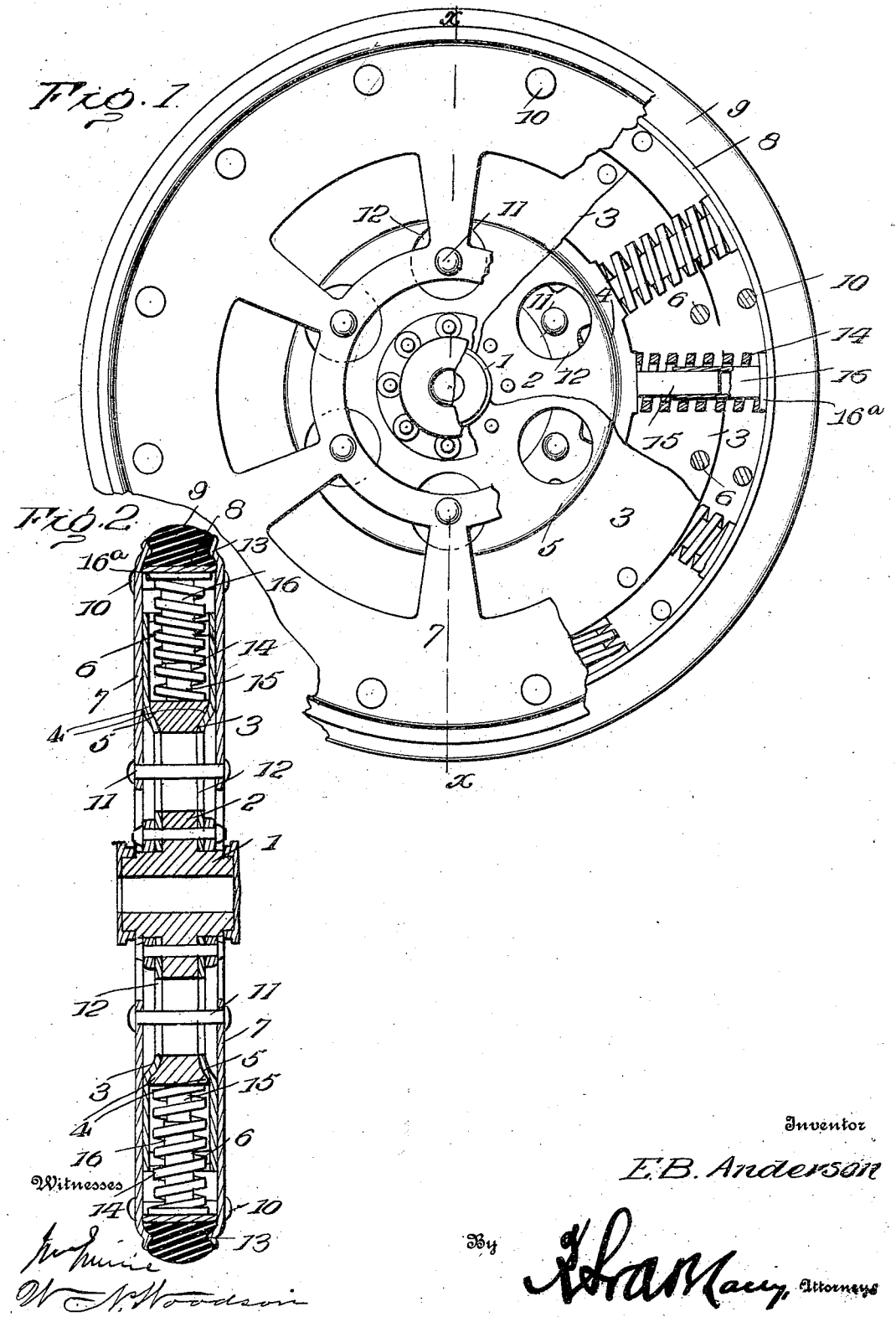

ELIAS B. ANDERSON, OF ROCK FALLS, ILLINOIS.

SPRING-WHEEL.

No. 922,658.

Specification of Letters Patent.

Patented May 25, 1909.

Application filed June 25, 1908. Serial No. 440,376.

*To all whom it may concern:*

Be it known that I, ELIAS B. ANDERSON, citizen of the United States, residing at Rock Falls, in the county of Whiteside and State of Illinois, have invented certain new and useful Improvements in Spring-Wheels, of which the following is a specification.

The present invention provides a wheel of novel formation having a yieldable and slidable rim, and cushioning devices between the rim and hub to absorb shock and vibration so as to secure ease and comfort to the passenger, as well as prevent injury to the vehicle or conveyance mounted upon wheels embodying the invention.

For a full understanding of the invention and the merits thereof and also to acquire a knowledge of the details of construction and means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings in which—

Figure 1 is a side view of a vehicle wheel embodying the invention, parts being broken away to show more clearly the relative arrangement of the elements and details of construction. Fig. 2 is a transverse section on the line x—x of Fig. 1.

Corresponding and like parts are referred to in the following description and indicated in all the views of the drawings by the same reference characters.

The wheel comprises a hub and rim between which the cushioning devices are located, said parts being relatively movable and the cushioning devices being of such resistance as to insure stability and yet neutralize shock and vibration and prevent transference of the same to the body of the vehicle. The hub 1 has a reduced central flange 2, the outer edges of which are flared as at 4. Bolted to the sides of the hub 1 are side plates 3 which are offset at 5, thereby increasing the space between their outer edges to accommodate the cushioning devices. Pins 6 connect the plates 3 at intervals near their outer edges and brace the same against both inward or outward movement. The rim comprises a ring 8 secured between the outer portions of side plates 7, and secured to the ring is the tire 9. Bolts or other fastenings 10 connect the outer portions of the plates 7 and also support the ring 8. Other bolts or fastenings 11 connect the inner portions of the plates 7 and pass through openings 12 formed in the flange 2 and side plates 3 at regular intervals. The side plates 7 fit close against the outer portions of the side plates 3, sufficient surface being provided to brace the wheel laterally against transverse stress. The tire 9 is secured between the outer portions of the plates 7, said outer portions being formed with inner extensions 13 to engage with opposite sides of the tire and prevent the possible displacement thereof, said tire being seated upon the ring 8 and supported thereby. The bolts or fastenings 11, in addition to connecting the inner portions of the plates 7, limit the movement of the rim, the size of the openings 12 determining the amplitude of movement in any direction.

The cushioning devices are interposed between the ring 8 and the periphery of the flange 2 and consists of springs, as shown in Figs. 1 and 2. The springs 14 may be of any size, material, construction and tension and are confined between the flange 2 and heads 16$^a$. Guide and retaining means coöperate with the springs 14 to confine the same in place and consist of a pin 15 and tube 16, the pin 15 being secured at its inner end to the flange 2, and tube 16 having a head or flange 16$^a$ at its outer end and seated against the inner side of the ring 8. The springs 14 are mounted upon guide means and are supported thereby. The pin 15 and tube 16 are of such relative length as to telescope and admit of the rim moving radially under vibration to absorb the shock produced thereby. The outer headed ends of the tube 16, are seated against the inner side of the rim 8, but are not rigidly connected thereto. This construction is essential to permit slidable movement between the rim and the heads 16$^a$ which are out of direct line of the load pressure.

In operation, when a load is applied, the cushioning devices in line with the pressure will compress. That is, the vertically disposed springs will be compressed and the pins and tubes 15 and 16 thereof will telescope. The cushioning devices out of alinement with the load pressure cannot become compressed to the same degree as those in alinement with the load owing to their varying angular dispositions. The rim 8 therefore slides over the faces of the heads 16ª and the springs 14 below the horizontal line of the center of the wheel will only be slightly compressed, according to its relative location to the line of load, while those above the horizontal line will expand accordingly. It will therefore be seen that as the wheel revolves, the rim will have a yielding movement and thereby slide over the heads of the tubular part of the telescopic connection and at the same time, the springs absorb the shock. It will also be observed that all the heads 16ª are in direct contact with the inner surface of the ring 8, which tends to equalize the strain on the parts.

Having thus described the invention, what is claimed as new is:

1. In a wheel, the combination of a hub provided with a flange formed with openings, and having its opposite outer edges enlarged, plates secured to the sides of the flanges, and formed with openings corresponding with the openings in the flange and extended beyond the edge of the flange, said plate being shaped to correspond to the enlarged edges of the hub, a rim, pins secured to the hub flange, tubes fitting over the pins, and having their outer ends at all times bearing on the inner surface of the rim, flanges on the tubes, springs mounted over the tubes and pins and bearing on the tube flanges and the periphery of the hub flange, side plates extended inwardly from the rim and overlapping the plates of the hub, and pins connecting the inner portions of the side plates and passing through the openings in the hub flange and the hub plates to limit the movement of the rim, the openings in the hub and plates being of larger diameter than the diameter of the pins.

2. A wheel as specified comprising a hub, a flange intermediately formed on said hub, said flange being flared outwardly at its outer edge, plates positioned against the opposite sides of said flange, said plates having a plurality of equi-distantly spaced apertures, concentrically disposed therein in registered relation, said plates being flared outwardly to register with the flared edge of said flange, a second pair of plates engaged against the outer faces of said plates, said second plates being cut away centrally, a plurality of bolts transversely disposed between said second pair of plates and engaged loosely through the apertures formed in said first plates, studs radially extended in equidistant relation about the periphery of said flange, cylinders loosely disposed over said studs for slidable engagement thereon, a ring carried upon the outer extremities of said cylinders, a tire mounted upon said ring and between the outer edges of said second plates and springs disposed about said cylinders and said studs between said flange and said ring for forming a resilient connection between said hub and said tire.

In testimony whereof I affix my signature in presence of two witnesses.

ELIAS B. ANDERSON. [L. S.]

Witnesses:
ROBERT J. SNYDER,
HOWARD E. MARSHALL.